(12) United States Patent
Harada

(10) Patent No.: US 8,000,035 B2
(45) Date of Patent: Aug. 16, 2011

(54) WIDE-ANGLE LENS, OPTICAL APPARATUS, AND METHOD FOR FOCUSING

(75) Inventor: Hiroki Harada, Zushi (JP)

(73) Assignee: Nikon Corporation, Tokyo (JP)

(*) Notice: Subject to any disclaimer, the term of this patent is extended or adjusted under 35 U.S.C. 154(b) by 64 days.

(21) Appl. No.: 12/346,695

(22) Filed: Dec. 30, 2008

(65) Prior Publication Data

US 2009/0185293 A1    Jul. 23, 2009

(30) Foreign Application Priority Data

Jan. 18, 2008 (JP) ................ 2008-009523
Jan. 18, 2008 (JP) ................ 2008-009532
Nov. 13, 2008 (JP) ................ 2008-291340
Nov. 13, 2008 (JP) ................ 2008-291344

(51) Int. Cl.
G02B 13/04 (2006.01)
G02B 9/00 (2006.01)
(52) U.S. Cl. ............................. 359/749; 359/754
(58) Field of Classification Search .......... 359/749–753
See application file for complete search history.

(56) References Cited

U.S. PATENT DOCUMENTS

| 4,806,003 | A | | 2/1989 | Mukai et al. |
| 5,631,780 | A | * | 5/1997 | Sato ............................. 359/749 |
| 6,084,719 | A | * | 7/2000 | Sugawara et al. ............. 359/651 |
| 7,239,456 | B2 | * | 7/2007 | Kimura et al. ................ 359/749 |
| 7,551,367 | B2 | | 6/2009 | Harada |

FOREIGN PATENT DOCUMENTS

| JP | 63-61213 A | 3/1988 |
| JP | 11-030743 A | 2/1999 |
| JP | 2009-20341 A | 1/2009 |

* cited by examiner

Primary Examiner — Jordan M. Schwartz
(74) Attorney, Agent, or Firm — Miles & Stockbridge P.C.

(57) ABSTRACT

Providing a wide-angle lens having high optical performance, an optical apparatus using thereof, and a method for focusing the wide-angle lens. The lens including, in order from an object, a first lens group G1 having negative refractive power, a second lens group G2 having positive refractive power, and a third lens group G3 having positive refractive power. Upon varying focusing from an object locating at infinity to an object locating at close distance, the first lens group G1 is fixed, and the second lens group G2 and the third lens group G3 are moved to the object side. The second lens group G2 includes a negative lens component L21 to the most object side, and a given conditional expression is satisfied.

20 Claims, 9 Drawing Sheets

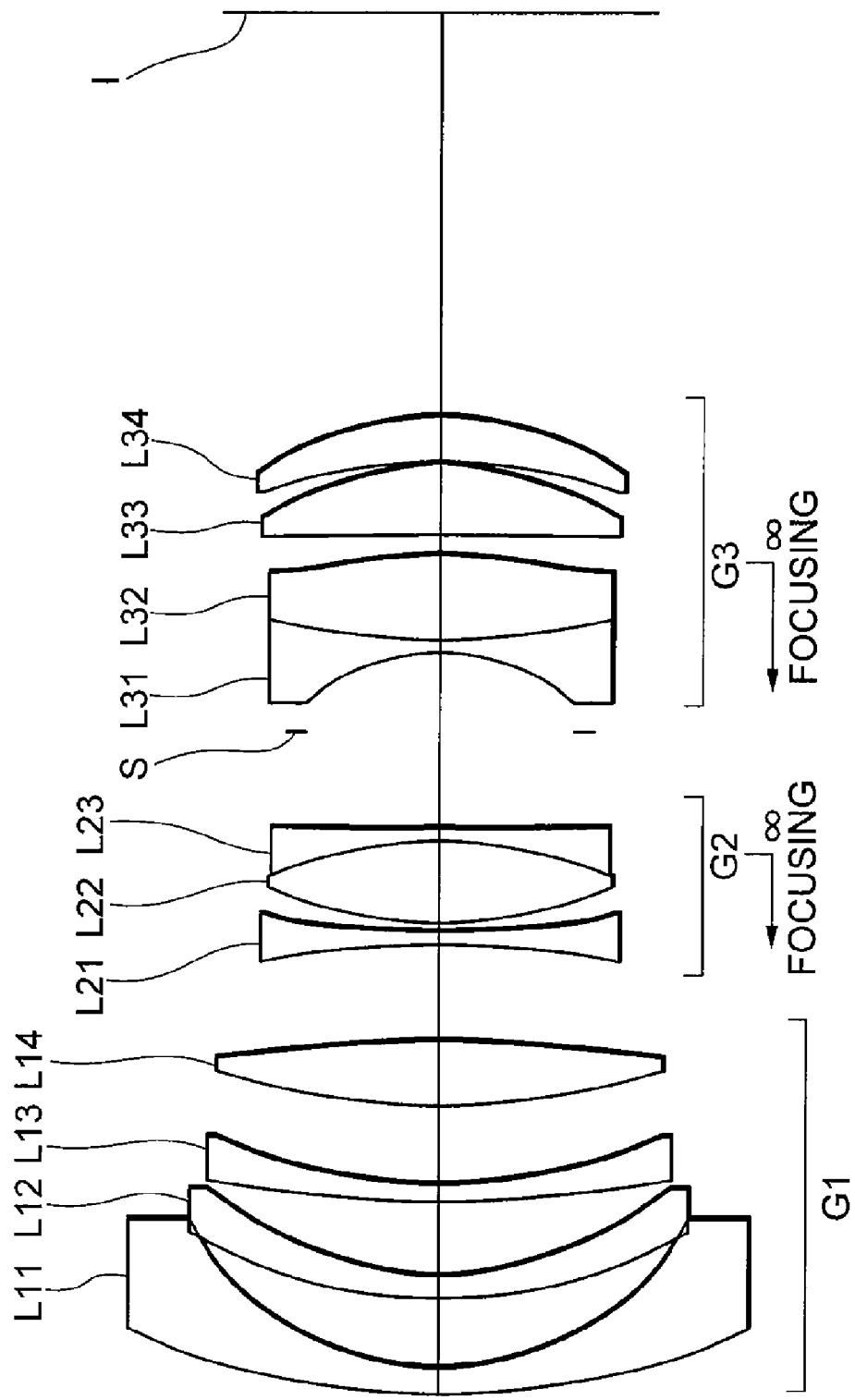

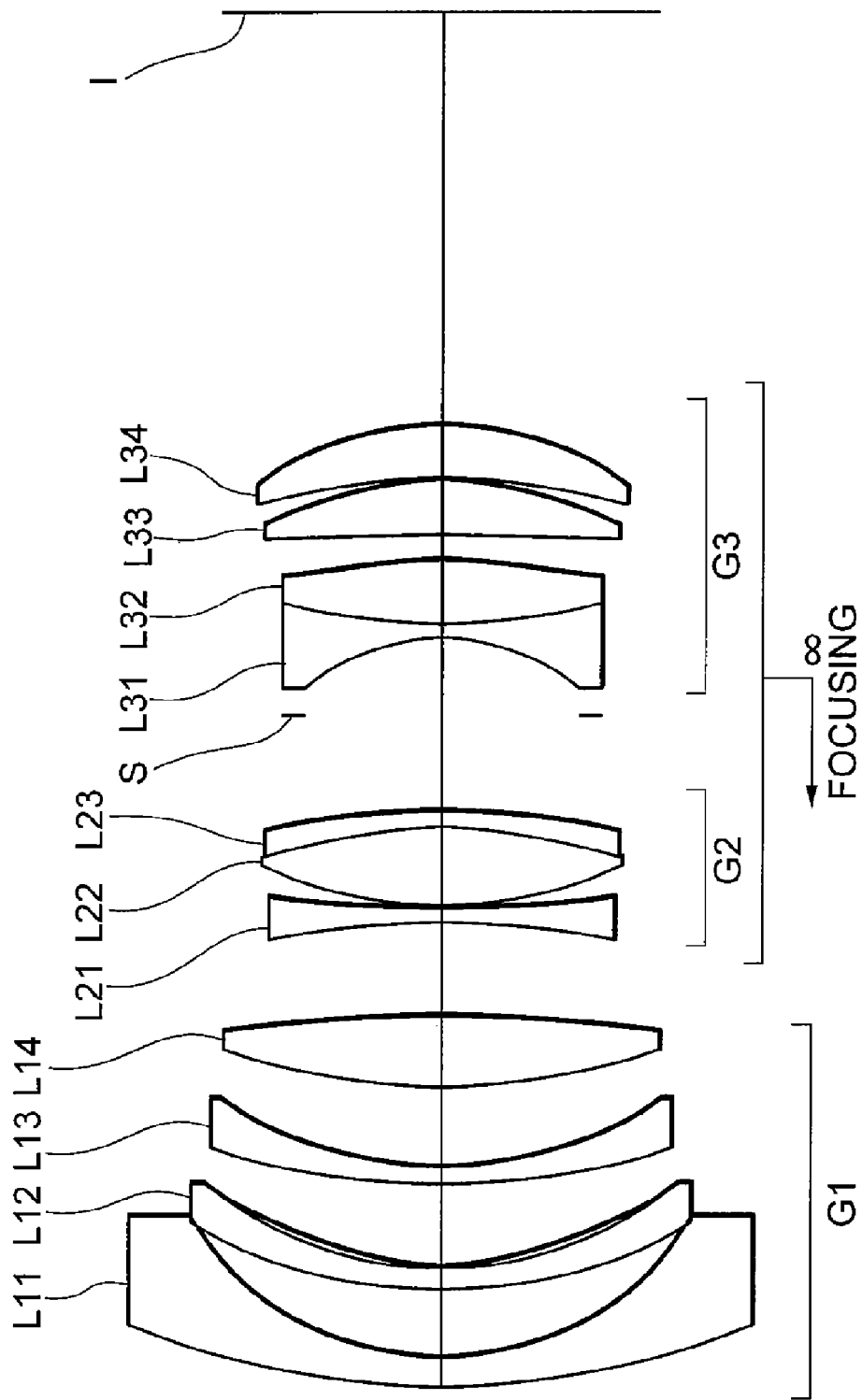

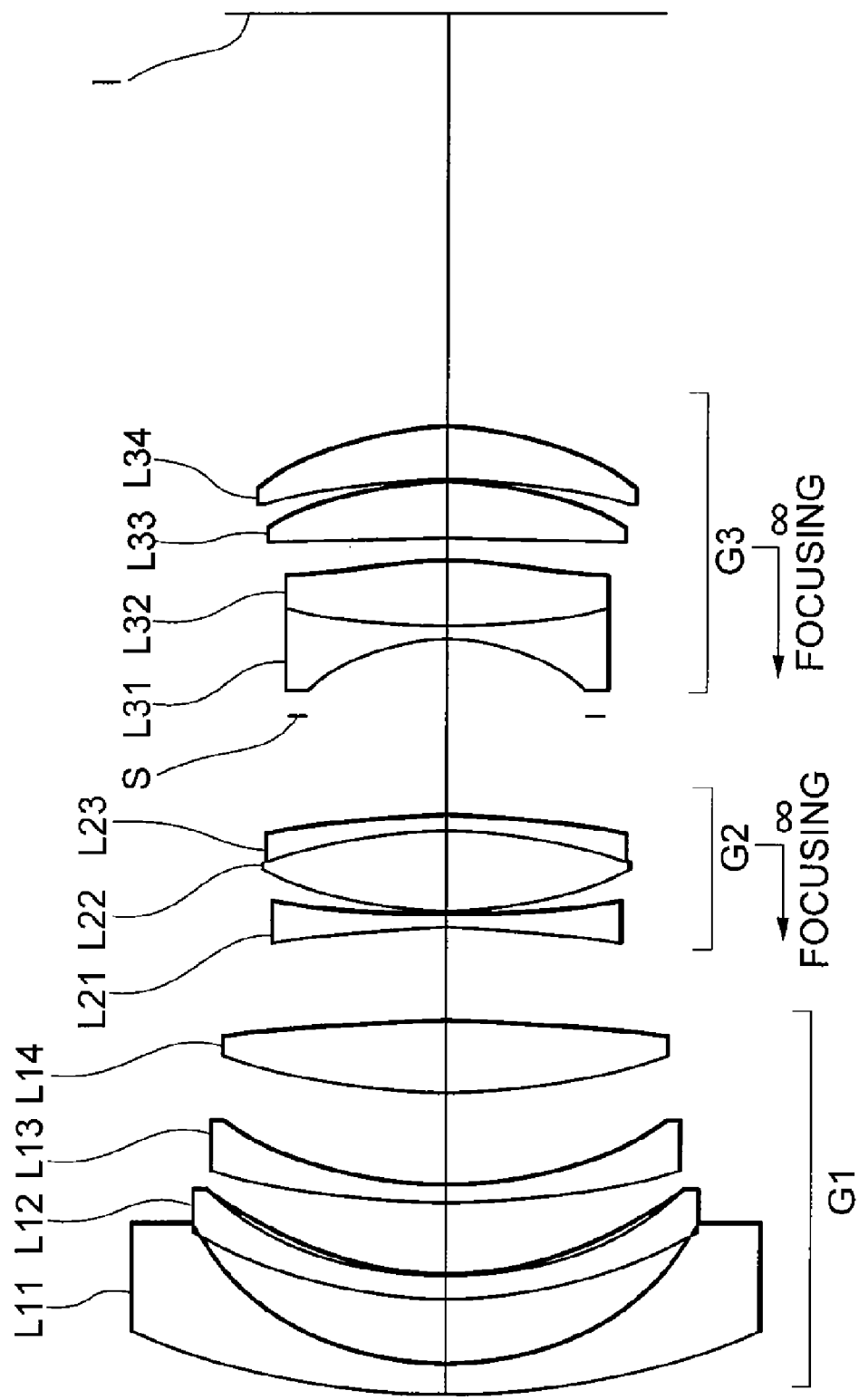

WIDE-ANGLE LENS, OPTICAL APPARATUS, AND METHOD FOR FOCUSING

The disclosure of the following priority applications are herein incorporated by reference:

Japanese Patent Application No. 2008-009523 filed on Jan. 18, 2008;

Japanese Patent Application No. 2008-009532 filed on Jan. 18, 2008;

Japanese Patent Application No. 2008-291340 filed on Nov. 13, 2008; and

Japanese Patent Application No. 2008-291344 filed on Nov. 13, 2008.

BACKGROUND OF THE INVENTION

1. Field of the Invention

The present invention relates to a wide-angle lens suitable for a single-lens reflex camera and a digital camera, an optical apparatus using thereof, and a method for focusing the wide-angle lens.

2. Related Background Art

There has been proposed a retrofocus lens with a leading lens having negative refractive power as a wide-angle lens capable of securing a sufficient back focal length suitable for a single-lens reflex camera and a digital camera in spite of a short focal length. In this lens type, there has been proposed a one constructed to be a large aperture having an f-number of about 1.4 such as Japanese Patent Application Laid-Open No. 11-030743.

However, in the conventional wide-angle lens, various aberrations have not been sufficiently corrected.

SUMMARY OF THE INVENTION

The present invention is made in view of the above-described problems, and has an object to provide a wide-angle lens having high optical performance, an optical apparatus using thereof, and a method for focusing the wide-angle lens.

According to a first aspect of the present invention, there is provided a wide-angle lens comprising, in order from an object: a first lens group having negative refractive power; a second lens group having positive refractive power; and a third lens group having positive refractive power; the second lens group and the third lens group being movable to the object for varying focusing from infinity to a close distance, a negative lens component being disposed to the most object side of the second lens group, and the following conditional expression (1) being satisfied:

$$6.00 < -f1/f \qquad (1)$$

where f denotes a focal length of the wide-angle lens, and f1 denotes a focal length of the first lens group.

According to a second aspect of the present invention, there is provided an optical apparatus equipped with the wide-angle lens according to the first aspect.

According to a third aspect of the present invention, there is provided a wide-angle lens comprising, in order from an object: a first lens group having negative refractive power; a second lens group having positive refractive power; and a third lens group having positive refractive power; the second lens group and the third lens group being movable to the object for varying focusing from infinity to a close distance, a negative lens component being disposed to the most object side of the second lens group, and the most object side lens surface of the lens component in the second lens group is a concave surface facing the object.

According to a fourth aspect of the present invention, there is provided a method for manufacturing a wide-angle lens that includes, in order from an object, a first lens group having negative refractive power, a second lens group having positive refractive power, and a third lens group having positive refractive power, the method comprising steps of: disposing a negative lens component to the most object side of the second lens group; disposing each lens in the first lens group, the second lens group, and the third lens group such that the following conditional expression (1) is satisfied:

$$6.00 < -f1/f \qquad (1)$$

where f denote a focal length of the wide-angle lens, and f1 denotes a focal length of the first lens group; and disposing the second lens group and the third lens group movable to the object for varying focusing from infinity to a close distance.

According to a fifth aspect of the present invention, there is provided a method for manufacturing a wide-angle lens that includes, in order from an object, a first lens group having negative refractive power, a second lens group having positive refractive power, and a third lens group having positive refractive power, the method comprising steps of: disposing a negative lens component to the most object side of the second lens group, the most object side lens surface of the lens component having a concave surface facing the object; and disposing the first lens group, the second lens group and the third lens group such that the second lens group and the third lens group are movable to the object for varying focusing from infinity to a close distance.

The present invention makes it possible to provide a wide-angle lens having high optical performance, an optical apparatus equipped therewith, and a method for focusing the wide-angle lens.

BRIEF DESCRIPTION OF THE DRAWINGS

FIG. 1 is a sectional view showing a lens configuration of a wide-angle lens according to Example 1.

FIGS. 2A, 2B and 2C are graphs showing various aberrations of the wide-angle lens according to Example 1, in which FIG. 2A shows upon focusing on an object locating at infinity ($\beta=0.00$), FIG. 2B shows upon focusing on an object locating at an intermediate distance ($\beta=-0.033$), and FIG. 2C shows upon focusing on an object locating at the closest distance ($\beta=-0.33$).

FIG. 3 is a sectional view showing a lens configuration of a wide-angle lens according to Example 2.

FIGS. 4A, 4B and 4C are graphs showing various aberrations of the wide-angle lens according to Example 2, in which FIG. 4A shows upon focusing on an object locating at infinity ($\beta=0.00$), FIG. 4B shows upon focusing on an object locating at an intermediate distance ($\beta=-0.033$), and FIG. 4C shows upon focusing on an object locating at the closest distance ($\beta=-0.33$).

FIG. 5 is a sectional view showing a lens configuration of a wide-angle lens according to Example 3.

FIGS. 6A, 6B and 6C are graphs showing various aberrations of the wide-angle lens according to Example 3, in which FIG. 6A shows upon focusing on an object locating at infinity ($\beta=0.00$), FIG. 6B shows upon focusing on an object locating at an intermediate distance ($\beta=-0.033$), and FIG. 6C shows upon focusing on an object locating at the closest distance ($\beta=-0.30$).

DESCRIPTION OF THE MOST PREFERRED EMBODIMENT

Figure 2A:
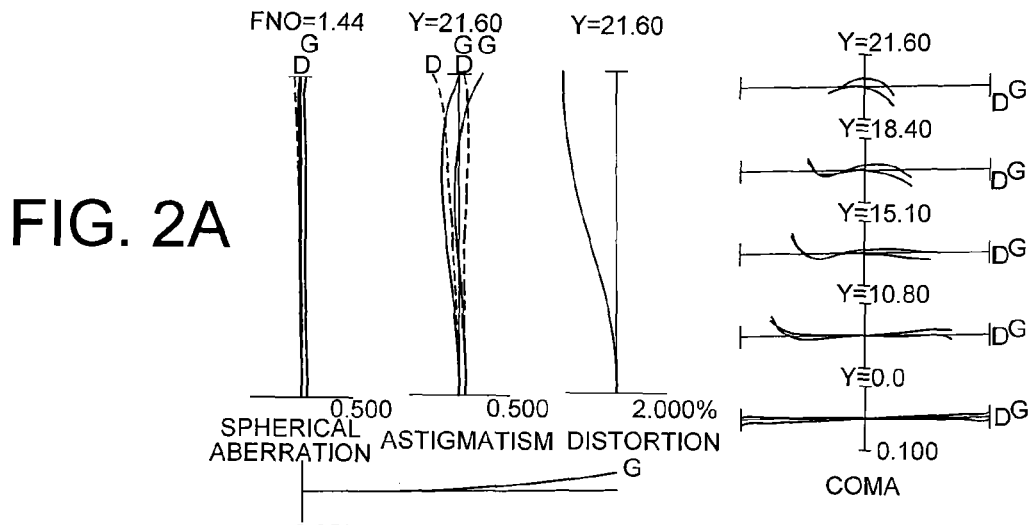

A wide-angle lens according to an embodiment of the present application is explained below.

A wide-angle lens according to the present embodiment includes, in order from an object, a first lens group having negative refractive power, a second lens group having positive refractive power, and a third lens group having positive refractive power. The first lens group is fixed, and the second lens group and the third lens group are movable to the object for varying focusing from infinity to a close distance. A negative lens component is disposed to the most object side of the second lens group. The following conditional expression (1) is satisfied:

$$6.00 < -f1/f \qquad (1)$$

where f denotes a focal length of the wide-angle lens, and f1 denotes a focal length of the first lens group.

Since a retrofocus lens has an asymmetrical power distribution in which an object side thereof is a negative lens group and an image side thereof is a positive lens group, it is impossible to compensate aberrations between the two lens groups, so that it becomes particularly difficult to correct negative distortion and coma. Accordingly, it becomes necessary to correct aberrations within each lens group as much as possible. For that purpose, although it is effective to weaken refractive power of the first lens group having negative refractive power, the back focal length becomes insufficient for a single-lens reflex camera. Then, a wide-angle lens according to the present embodiment is constructed to satisfy the above described conditional expression (1), which defines the most effective range for balancing aberration correction with the back focal length.

When the ratio −f1/f is equal to or falls below the lower limit of conditional expression (1), negative refractive power of the first lens group becomes too strong, so that it becomes difficult to sufficiently correct positive curvature of field and negative distortion emerged from off-axis principal ray on the corner of the image.

As described above, the present embodiment has a unique characteristic that the most object side of the second lens group is a negative lens component. This results in the fact that the combination of the second lens group and the third lens group also forms a retrofocus lens configuration by disposing the negative lens component as a leading lens. Accordingly, the back focal length can be extend, so that it becomes possible to make the lower limit of conditional expression (1) larger.

Off-axis principal ray on the corner of the image passing through the first lens group, which satisfies conditional expression (1), is incident on the second lens group with a large angle of incidence. Accordingly, with disposing a negative lens component to the most object side of the second lens group, the incident ray to the lens group disposing to the image side of the negative lens component is lead closer to parallel with the optical axis, so that it becomes effective to correct off-axis coma.

In order to secure the effect of the present embodiment, it is preferable to set the lower limit of conditional expression (1) to 7.50.

In a wide-angle lens according to the present embodiment, an aperture stop is preferably disposed between the second lens group and the third lens group.

With this lens configuration, it becomes possible to excellently correct spherical aberration and coma.

In a wide-angle lens according to the present embodiment, the following conditional expression (2) is preferably satisfied:

$$1.00 < f2/f3 < 2.00 \qquad (2)$$

where f2 denotes a focal length of the second lens group, and f3 denotes a focal length of the third lens group.

Conditional expression (2) defines an appropriate range of refractive ratio between the second lens group and the third lens group, which are positive lens groups.

When the ratio f2/f3 is equal to or exceeds the upper limit of conditional expression (2), positive refractive power leans to the third lens group, so that positive refractive power of the third lens group becomes strong. Accordingly, it becomes difficult to correct negative spherical aberration and coma, so that it is undesirable. On the other hand, when the ratio f2/f3 is equal to or falls below the lower limit of conditional expression (2), it becomes difficult to secure the back focal length, so that it is undesirable. Moreover, spherical aberration becomes worse.

In order to secure the effect of the present embodiment, it is preferable to set the upper limit of conditional expression (2) to 1.90. In order to secure the effect of the present embodiment, it is preferable to set the lower limit of conditional expression (2) to 1.30.

In a wide-angle lens according to the present embodiment, the most object side surface of the negative lens component in the second lens group is preferably a concave surface facing the object.

In the second lens group, incident height of the light flux emerged from an on-axis object becomes higher than that in the first lens group, so that the light flux strongly effects to spherical aberration. Accordingly, since the light flux emerged from an on-axis object becomes divergent by the first lens group having negative refractive power, when a deviation angle of a lens surface to the light flux is large, a large amount of spherical aberration is generated, so that it is undesirable. In this respect, since the most object side lens surface of the lens component in the second lens group is a concave surface facing the object, it becomes possible to suppress the deviation angle to be small, so that over correction of spherical aberration, which is a typical problem of a large aperture lens, can be prevented. As a result, the number of lenses in the second and third lens groups can be reduced and the total lens length can be shortened. With respect to the light flux on the corner of the image, since the most object side lens surface of the lens component in the second lens group is a concave surface facing the object, it becomes possible to effectively correct coma, in particular, sagittal coma. As a result, it becomes possible to realize excellent correction of aberrations without increasing the diameter of a filter.

In a wide-angle lens according to the present embodiment, the most image side surface of the negative lens component in the second lens group is preferably a concave surface facing the image.

With this lens configuration, it becomes possible to excellently correct spherical aberration and coma by the most image side lens surface of the negative lens component in the second lens group and a lens component directly behind the negative lens component.

In a wide-angle lens according to the present embodiment, it is preferable that the first lens group includes, in order from an object, three negative lenses.

With this lens configuration, it becomes possible to reduce negative distortion and coma generated by the first lens group.

In a wide-angle lens according to the present embodiment, the following conditional expression (3) is preferably satisfied:

$$0.30 < f/f3 < 1.00 \quad (3)$$

where f denotes a focal length of the wide-angle lens, and f3 denotes a focal length of the third lens group.

Conditional expression (3) defines an appropriate range of the refractive power ratio of the wide-angle lens to the third lens group.

When the ratio f/f3 is equal to or exceeds the upper limit of conditional expression (3), refractive power of the third lens group becomes too strong, so that it becomes difficult to correct negative spherical aberration and coma. Accordingly, optical performance suddenly becomes worse, so that it is undesirable. On the other hand, when the ratio f/f3 is equal to or falls below the lower limit of conditional expression (3), refractive power of the third lens group becomes too weak. As a result, refractive power of the second lens group becomes too strong. Accordingly, aberrations becomes worse similar to the case upon exceeding upper limit, or it becomes difficult to secure the back focal length, so that refractive power of the first lens group is made to be strong resulting in worsening positive curvature of field and negative distortion. Accordingly, it is undesirable.

In order to secure the effect of the present embodiment, it is preferable to set the upper limit of conditional expression (3) to 0.90. In order to secure the effect of the present embodiment, it is preferable to set the lower limit of conditional expression (3) to 0.40.

In a wide-angle lens according to the present embodiment, the first lens group include at least one positive lens which satisfies both of the following conditional expressions (4) and (5):

$$1.800 < n1p \quad (4)$$

$$28.00 < v1p \quad (5)$$

where n1p denotes an average value of refractive indices of positive lenses in the first lens group at d-line (wavelength λ=587.6 nm), and v1p denotes an average value of Abbe numbers of positive lenses in the first lens group at d-line (wavelength λ=587.6 nm).

Conditional expressions (4) and (5) define glass properties of the positive lenses in the first lens group.

Negative distortion, positive curvature of field, and coma generated in the negative lens group in the retrofocus lens can be reduced by introducing a positive lens having a high refractive index in the negative lens group. However, a glass material with a high refractive index generally has large dispersion. In other words, since an Abbe number is small, a generation amount of lateral chromatic aberration of a positive lens differs from that of a negative lens in accordance with an image height. Accordingly, negative lateral chromatic aberration is liable to be generated in an intermediate image height, and positive lateral chromatic aberration is liable to be abruptly generated in a higher image height.

When the value n1p is equal to or falls below the lower limit of conditional expression (4), it becomes easy to choose a glass material having a large Abbe number, so that lateral chromatic aberration becomes easy to be corrected. However, distortion, curvature of field, and coma generated by the negative lenses cannot be corrected.

In order to secure the effect of the present embodiment, it is preferable to set the lower limit of conditional expression (4) to 1.840. In order to further secure the effect of the present embodiment, it is most preferable to set the lower limit of conditional expression (4) to 1.900.

When the value v1p is equal to or falls below the lower limit of conditional expression (5), it becomes easy to choose a glass material having a high refractive index, so that distortion, curvature of field, and coma become easy to be corrected. However, since so-called secondary dispersion of the glass material becomes drastically large, lateral chromatic aberration cannot be sufficiently corrected, so that it is undesirable.

In order to secure the effect of the present embodiment, it is preferable to set the lower limit of conditional expression (5) to 30.00. In order to further secure the effect of the present embodiment, it is most preferable to set the lower limit of conditional expression (5) to 31.00.

In a wide-angle lens according to the present embodiment, upon varying focusing from infinity to a close distance, the second lens group and the third lens group preferably satisfy the following conditional expression (6):

$$1.00 \leq \Delta 3/\Delta 2 < 1.50 \quad (6)$$

where $\Delta 3$ denotes a moving amount of the third lens group, and $\Delta 2$ denotes a moving amount of the second lens group.

Conditional expression (6) defines a degree of reduction of the distance between the second lens group and the third lens group by defining a ratio of the moving speed of the third lens group to that of the second lens group.

Upon varying focusing from infinity to a close distance, the first lens group is fixed, and the second lens group and the third lens group, both of which have positive refractive power, are moved to the object side. In this case, increasing aberrations are mainly spherical aberration, coma and astigmatism. These aberrations can be excellently corrected by decreasing the distance between the second lens group and the aperture stop or the third lens group upon varying focusing from infinity to a close distance.

When the ratio $\Delta 3/\Delta 2$ falls below the lower limit of conditional expression (6), the distance between the second lens group and the third lens group increases upon varying focusing form infinity to a close distance, so that mainly spherical aberration, coma and astigmatism increase. On the other hand, when the ratio $\Delta 3/\Delta 2$ is equal to or exceeds the upper limit of conditional expression (6), the moving amount of the third lens group becomes too large, and spherical aberration, coma and astigmatism become overcorrected, so that aberrations become worse.

In order to secure the effect of the present embodiment, it is preferable to set the upper limit of conditional expression (6) to 1.30. In order to secure the effect of the present embodiment, it is preferable to set the lower limit of conditional expression (6) to 1.05.

In a wide-angle lens according to the present embodiment, upon varying focusing from infinity to a close distance, the second lens group and the third lens group are preferably moved to the object side with the same moving amount.

With this lens configuration, it becomes possible to integrate the second lens group with the third lens group, so that configuration can be simplified. Accordingly, it becomes possible to suppress variation in aberration upon focusing caused by a manufacturing error.

A wide-angle lens according to another aspect of the present embodiment includes, in order from an object, a first lens group having negative refractive power, a second lens group having positive refractive power, and a third lens group having positive refractive power. The first lens group is fixed, and the second lens group and the third lens group are movable to the object side for varying focusing from infinity to a close distance. The second lens group has a negative lens component to the most object side. The most object side lens surface of the negative lens component is a concave surface facing the object.

With this lens configuration, it becomes possible to secure a sufficient back focal length, and to effectively correct coma, in particular, sagittal coma. As a result, it becomes possible to reduce the number of lenses composing the second lens group and the third lens group, and to realize excellent correction of aberrations without increasing the diameter of a filter.

Each example according to the present embodiment will be explained below with reference to the accompanying drawings.

EXAMPLE 1

FIG. 1 is a sectional view showing a lens configuration of a wide-angle lens according to Example 1.

The wide-angle lens according to Example 1 is composed of, in order from an object along an optical axis, a first lens group G1 having negative refractive power, a second lens group G2 having positive refractive power with a negative lens component disposing to the most object side, an aperture stop S, and a third lens group G3 having positive refractive power.

Upon varying focusing from an object locating at infinity to an object locating at close distance, the first lens group G1 is fixed, and the second lens group G2 and the third lens group G3 are moved to the object side. On this occasion, the second lens group G2 and the third lens group G3 are moved with different speeds.

The first lens group G1 is composed of, in order from the object, a negative meniscus lens L11 having a convex surface facing the object, a negative meniscus lens L12 having a convex surface facing the object, a negative meniscus lens L13 having a convex surface facing the object, and a double convex positive lens L14. The image plane I side lens surface of the negative meniscus lens L12 is an aspherical surface.

The second lens group G2 is composed of, in order from the object, a double concave negative lens L21, and a cemented lens constructed by a double convex positive lens L22 cemented with a negative meniscus lens L23 having a convex surface facing the image plane I.

The third lens group G3 is composed of, in order from the object, a cemented lens constructed by a double concave negative lens L31 cemented with a double convex positive lens L32, a double convex positive lens L33, and a positive meniscus lens L34 having a convex surface facing the image plane I. The image plane I side of the positive lens L32 is an aspherical surface.

The positive lens L14 in the first lens group G1 has a refractive index of 1.800 or more, and an Abbe number of 30.00 or more.

Various values associated with the wide-angle lens according to Example 1 are listed in Table 1.

In [Specifications], f denotes a focal length at d-line, FNO denotes an f-number, 2ω denotes an angle of view in degrees, Y denotes an image height, TL denotes a total lens length, and Bf denotes a back focal length upon focusing on an object locating at infinity.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "vd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Aspherical Surface Data], an aspherical surface is exhibited by the following expression:

$$X(y)=(y^2/r)/[1+[1-\kappa(y^2/r^2)]^{1/2}]+A4 \times y^4 + A6 \times y^6 + A8 \times y^8 + A10 \times y^{10} + A12 \times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, An denotes an aspherical coefficient of n-th order, "E-n" denotes "×10$^{-n}$", for example, "1.234E−05" denotes "1.234×10$^{-5}$" and the position of an aspherical surface is expressed by attaching "*" to the right side of the surface number.

In [Variable Distances], "Infinity" denotes a case upon focusing on an object locating at infinity, "Intermediate" denote a case upon focusing on an object locating at an intermediate distance, "Closest Distance" denotes a case focusing on an object locating at the closest distance, Di denotes a variable distance at the surface number i, β denotes an imaging magnification, and Bf denotes a back focal length.

In [Values for Conditional Expressions], a value for each conditional expression is shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

| [Specifications] |
|---|
| f = 24.70 |
| FNO = 1.44 |
| 2ω = 82.34 |
| Y = 21.60 |
| TL = 129.69 |
| Bf = 38.10 |

| [Lens Data] | | | | |
|---|---|---|---|---|
| i | r | d | nd | vd |
| 1 | 67.18 | 2.60 | 1.804000 | 46.57 |
| 2 | 27.00 | 6.23 | | |
| 3 | 45.00 | 2.30 | 1.772499 | 49.60 |
| 4* | 28.80 | 6.75 | | |
| 5 | 97.97 | 1.60 | 1.496999 | 81.54 |
| 6 | 47.69 | 7.40 | | |
| 7 | 62.34 | 6.10 | 1.903660 | 31.31 |
| 8 | −167.37 | (d8) | | |
| 9 | −101.31 | 1.20 | 1.804000 | 46.57 |
| 10 | 83.83 | 0.56 | | |

TABLE 1-continued

| | | | | |
|---|---|---|---|---|
| 11 | 37.28 | 7.84 | 1.816000 | 46.62 |
| 12 | −44.22 | 1.20 | 1.784723 | 25.68 |
| 13 | −97.41 | (d13) | | |
| 14 | ∞ | 7.30 | Aperture Stop S | |
| 15 | −20.21 | 1.20 | 1.805181 | 25.46 |
| 16 | 58.98 | 8.00 | 1.816000 | 46.62 |
| 17* | −52.18 | 1.91 | | |
| 18 | 676.80 | 6.57 | 1.729157 | 54.68 |
| 19 | −32.13 | 0.20 | | |
| 20 | −56.11 | 4.21 | 1.729157 | 54.68 |
| 21 | −32.58 | (Bf) | | |

[Aspherical Surface Data]

Surface Number: 4

K = 0.00
A4 = 1.49400E−06
A6 = −4.07170E−09
A8 = 1.23490E−11
A10 = −2.37110E−14
A12 = 1.08520E−17

Surface Number: 17

K = 1.0192
A4 = 1.57740E−05
A6 = 1.57400E−08
A8 = −3.06580E−11
A10 = 0.00000E+00
A12 = 0.00000E+00

[Variable Distances]

| | Infinity | Intermediate | Closest Distance |
|---|---|---|---|
| β = | 0.00 | −0.033 | −0.33 |
| d8 = | 9.00 | 8.26 | 2.30 |
| d13 = | 9.40 | 9.29 | 8.40 |

[Values for Conditional Expressions]

(1): −f1/f = 11.05
(2): f2/f3 = 1.73
(3): f/f3 = 0.57
(4): n1p = 1.904
(5): ν1p = 31.31
(6): Δ3/Δ2 = 1.15

Figure 2B:
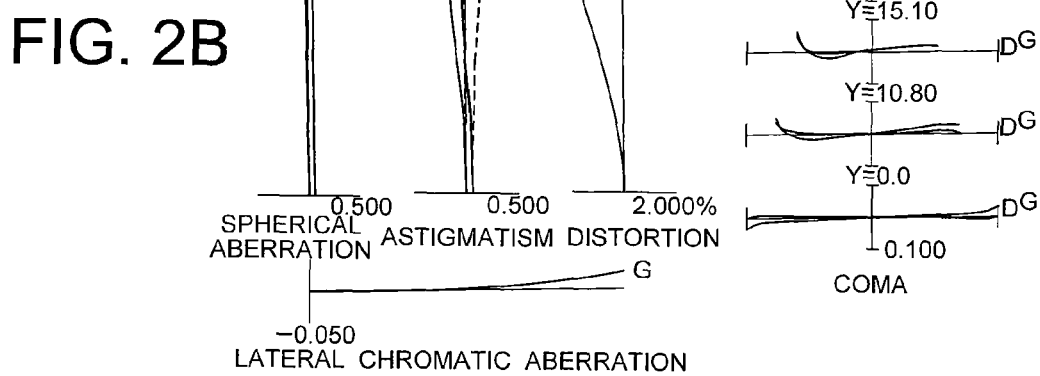
Figure 2C:
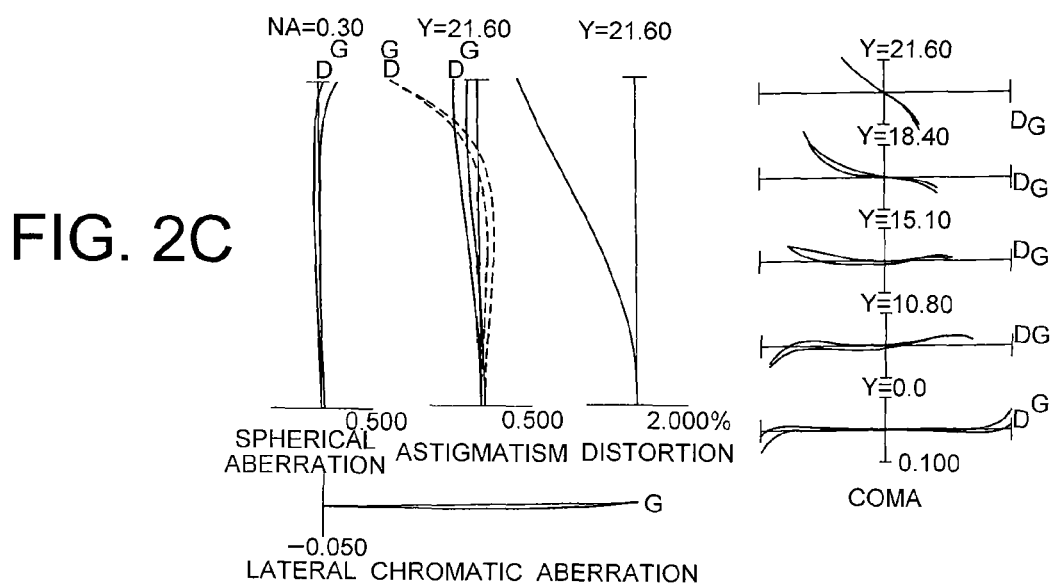

FIGS. 2A, 2B and 2C are graphs showing various aberrations of the wide-angle lens according to Example 1, in which FIG. 2A shows upon focusing on an object locating at infinity (β=0.00), FIG. 2B shows upon focusing on an object locating at an intermediate distance (β=−0.033), and FIG. 2C shows upon focusing on an object locating at the closest distance (β=−0.33).

In respective graphs, FNO denotes an f-number, Y denotes an image height, and NA denotes a numerical aperture. In graphs showing spherical aberration, an f-number or a numerical aperture with respect to the maximum aperture is shown. In graphs showing astigmatism and distortion, the maximum value of the image height is shown. In graphs showing coma, respective image heights are shown. In respective graphs, D denotes aberration curve at d-line (wavelength λ=587.6 nm), and G denotes aberration curve at g-line (wavelength λ=435.8 nm). In graphs showing astigmatism, a solid line indicates a sagittal image plane, and a broken line indicates a meridional image plane.

The above-described explanations regarding various aberration graphs are the same as the other Examples.

As is apparent from the respective graphs, the wide-angle lens according to Example 1 shows superb optical performance as a result of good corrections to various aberrations.

EXAMPLE 2

FIG. 3 is a sectional view showing a lens configuration of a wide-angle lens according to Example 2.

The wide-angle lens according to Example 2 is composed of, in order from an object along an optical axis, a first lens group G1 having negative refractive power, a second lens group G2 having positive refractive power with a negative lens component to the most object side, an aperture stop S, and a third lens group G3 having positive refractive power.

Upon varying focusing from an object locating at infinity to an object locating at close distance, the first lens group G1 is fixed, and the second lens group G2 and the third lens group G3 are moved to the object side. On this occasion, the second lens group G2 and the third lens group G3 are moved with the same speed.

The first lens group G1 is composed of, in order from the object, a negative meniscus lens L11 having a convex surface facing the object, a negative meniscus lens L12 having a convex surface facing the object, a negative meniscus lens L13 having a convex surface facing the object, and a double convex positive lens L14. An image plane I side of the negative meniscus lens L12 is an aspherical surface.

The second lens group G2 is composed of, in order from the object, a double concave negative lens L21, and a cemented lens constructed by a double convex positive lens L22 cemented with a negative meniscus lens L23 having a convex surface facing the image plane I side.

The third lens group G3 is composed of, in order from the object, a cemented lens constructed by a double concave negative lens L31 cemented with a double convex positive lens L32, a positive meniscus lens L33 having a convex surface facing the image plane I side, and a positive meniscus lens L34 having a convex surface facing the image plane I side. The image plane I side of the positive lens L32 is an aspherical surface.

The positive lens L14 in the first lens group G1 has a refractive index of 1.800 or more, and an Abbe number of 30.00 or more.

Various values associated with the wide-angle lens according to Example 2 are listed in Table 2.

TABLE 2

[Specifications]

f = 24.70
FNO = 1.44
2ω = 82.34
Y = 21.60
TL = 127.49
Bf = 38.10

[Lens Data]

| i | r | d | nd | νd |
|---|---|---|---|---|
| 1 | 72.00 | 2.60 | 1.804000 | 46.57 |
| 2 | 27.50 | 6.20 | | |
| 3 | 45.00 | 2.10 | 1.772499 | 49.60 |
| 4 | 34.10 | 0.20 | 1.553890 | 38.09 |
| 5* | 28.60 | 7.50 | | |
| 6 | 64.43 | 1.60 | 1.496999 | 81.54 |
| 7 | 35.37 | 7.49 | | |
| 8 | 56.25 | 6.50 | 1.903660 | 31.31 |
| 9 | −233.35 | (d9) | | |
| 10 | −106.99 | 1.30 | 1.804000 | 46.57 |
| 11 | 86.24 | 0.20 | | |
| 12 | 35.91 | 7.54 | 1.816000 | 46.62 |
| 13 | −56.08 | 1.30 | 1.860740 | 23.06 |
| 14 | −98.62 | 9.33 | | |

TABLE 2-continued

| 15 | ∞ | 7.00 | Aperture Stop S | |
|----|---|------|-----------------|---|
| 16 | −20.59 | 1.30 | 1.846660 | 23.78 |
| 17 | 48.93 | 6.00 | 1.796680 | 45.34 |
| 18* | −51.58 | 2.37 | | |
| 19 | −941.51 | 5.07 | 1.804000 | 46.57 |
| 20 | −37.73 | 0.20 | | |
| 21 | −70.87 | 4.92 | 1.804000 | 46.57 |
| 22 | −30.78 | (Bf) | | |

[Aspherical Surface Data]

Surface Number: 5

K = 0.00
A4 = −4.57380E−07
A6 = −8.82940E−09
A8 = 2.29950E−11
A10 = −4.35790E−14
A12 = 2.46620E−17

Surface Number: 18

K = 1.0192
A4 = 1.71730E−05
A6 = 1.89790E−08
A8 = −3.90560E−11
A10 = 0.00000E+00
A12 = 0.00000E+00

[Variable Distances]

| | Infinity | Intermediate | Closest Distance |
|---|----------|--------------|------------------|
| β = | 0.00 | −0.033 | −0.25 |
| d9 = | 8.67 | 7.84 | 2.35 |

[Values for Conditional Expressions]

(1): −f1/f = 10.53
(2): f2/f3 = 1.63
(3): f/f3 = 0.56
(4): n1p = 1.904
(5): ν1p = 31.31
(6): Δ3/Δ2 = 1.00

Figure 4A:
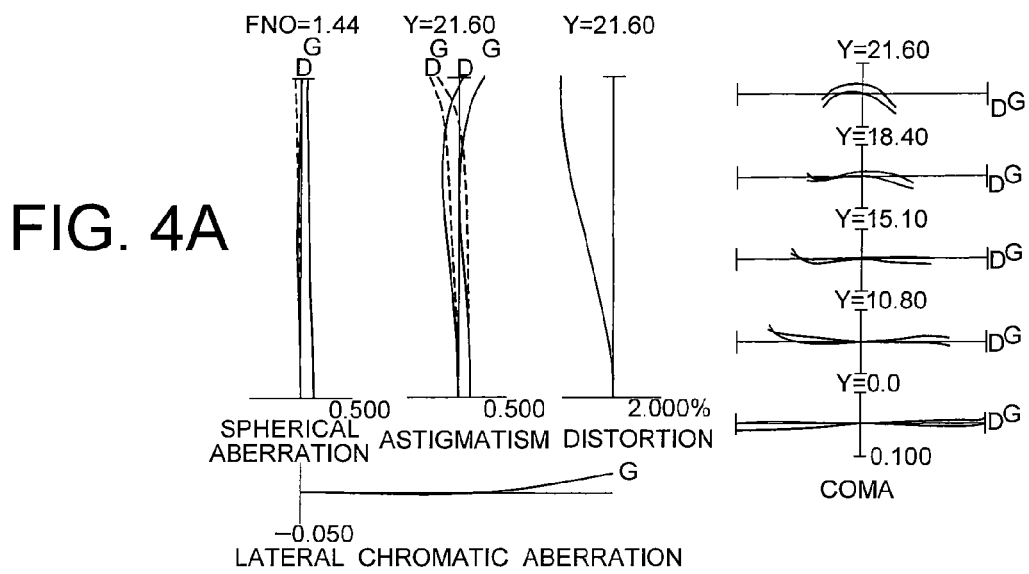
Figure 4B:
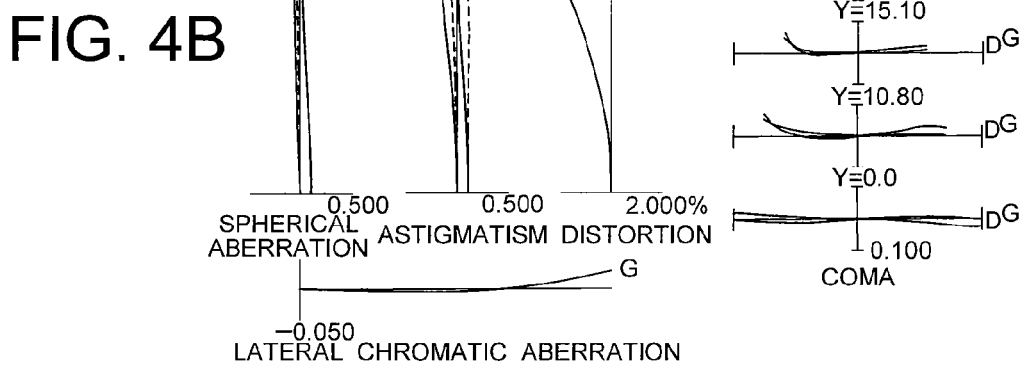
Figure 4C:
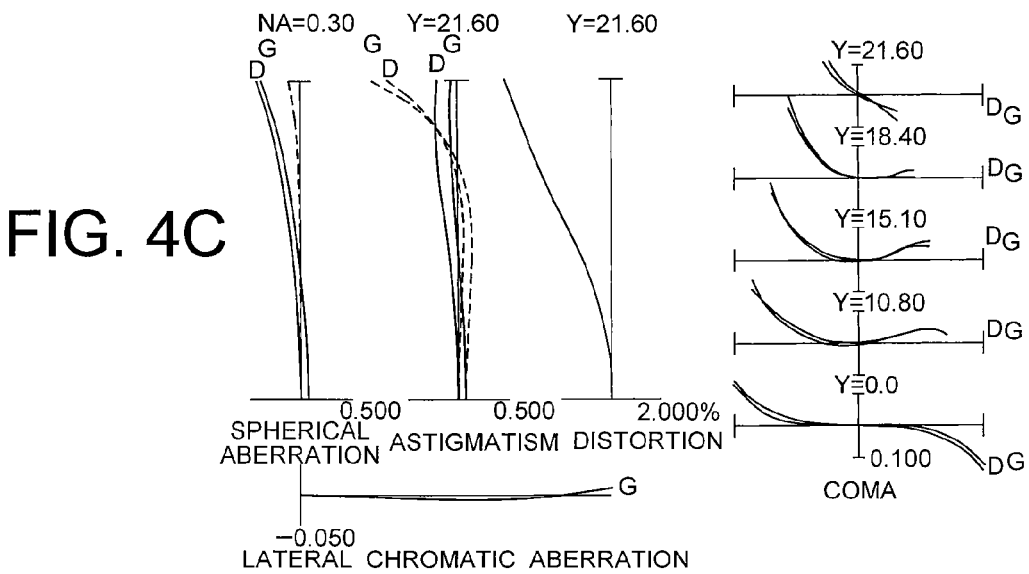

FIGS. 4A, 4B and 4C are graphs showing various aberrations of the wide-angle lens according to Example 2, in which FIG. 4A shows upon focusing on an object locating at infinity (β=0.00), FIG. 4B shows upon focusing on an object locating at an intermediate distance (β=−0.033), and FIG. 4C shows upon focusing on an object locating at the closest distance (β=−0.33).

As is apparent from the respective graphs, the wide-angle lens according to Example 2 shows superb optical performance as a result of good corrections to various aberrations.

EXAMPLE 3

FIG. 5 is a sectional view showing a lens configuration of a wide-angle lens according to Example 3.

The wide-angle lens according to Example 3 is composed of, in order from an object along an optical axis, a first lens group G1 having negative refractive power, a second lens group G2 having positive refractive power with a negative lens component to the most object side, an aperture stop S, and a third lens group G3 having positive refractive power.

Upon varying focusing from an object locating at infinity to an object locating at close distance, the first lens group G1 is fixed, and the second lens group G2 and the third lens group G3 are moved to the object side. On this occasion, the second lens group G2 and the third lens group G3 are moved with different speeds.

The first lens group G1 is composed of, in order from the object, a negative meniscus lens L11 having a convex surface facing the object, a negative meniscus lens L12 having a convex surface facing the object, a negative meniscus lens L13 having a convex surface facing the object, and a double convex positive lens L14. An image plane I side of the negative meniscus lens L12 is an aspherical surface.

The second lens group G2 is composed of, in order from the object, a double concave negative lens L21, and a cemented lens constructed by a double convex positive lens L22 cemented with a negative meniscus lens L23 having a convex surface facing the image plane I side.

The third lens group G3 is composed of, in order from the object, a cemented lens constructed by a double concave negative lens L31 cemented with a double convex positive lens L32, a positive meniscus lens L33 having a convex surface facing the image plane I side, and a positive meniscus lens L34 having a convex surface facing the image plane I side. The image plane I side of the positive lens L32 is an aspherical surface.

The positive lens L14 in the first lens group G1 has a refractive index of 1.800 or more, and an Abbe number of 30.00 or more.

Various values associated with the wide-angle lens according to Example 3 are listed in Table 3.

TABLE 3

[Specifications]

f = 24.70
FNO = 1.44
2ω = 82.34
Y = 21.60
TL = 127.44
Bf = 38.10

[Lens Data]

| i | r | d | nd | νd |
|---|---|---|----|----|
| 1 | 70.00 | 2.60 | 1.804000 | 46.57 |
| 2 | 27.46 | 6.04 | | |
| 3 | 45.00 | 2.10 | 1.772499 | 49.60 |
| 4 | 33.68 | 0.20 | 1.553890 | 38.09 |
| 5* | 28.60 | 6.50 | | |
| 6 | 71.73 | 1.60 | 1.496999 | 81.54 |
| 7 | 36.88 | 8.58 | | |
| 8 | 59.20 | 6.50 | 1.903660 | 31.31 |
| 9 | −201.97 | (d9) | | |
| 10 | −112.04 | 1.30 | 1.804000 | 46.57 |
| 11 | 85.44 | 0.20 | | |
| 12 | 35.99 | 7.58 | 1.816000 | 46.62 |
| 13 | −54.18 | 1.30 | 1.860740 | 23.06 |
| 14 | −100.10 | (d14) | | |
| 15 | ∞ | 7.00 | Aperture Stop S | |
| 16 | −20.45 | 1.30 | 1.846660 | 23.78 |
| 17 | 59.55 | 6.00 | 1.796680 | 45.34 |
| 18* | −53.33 | 2.11 | | |
| 19 | −1673.35 | 5.20 | 1.772499 | 49.60 |
| 20 | −36.24 | 0.20 | | |
| 21 | −71.75 | 4.87 | 1.804000 | 46.57 |
| 22 | −30.85 | (Bf) | | |

[Aspherical Surface Data]

Surface Number: 5

K = 0.00
A4 = −2.64810E−08
A6 = −8.96440E−09
A8 = 2.41970E−11
A10 = −4.46660E−14
A12 = 2.44010E−17

Surface Number: 18

K = 1.0192
A4 = 1.72770E−05

TABLE 3-continued

A6 = 1.78190E−08
A8 = −4.07240E−11
A10 = 0.00000E+00
A12 = 0.00000E+00

[Variable Distances]

|  | Infinity | Intermediate | Closest Distance |
|---|---|---|---|
| β = | 0.00 | −0.033 | −0.30 |
| d9 = | 8.70 | 7.93 | 1.97 |
| d14 = | 9.48 | 9.40 | 8.47 |

[Values for Conditional Expressions]

(1): −f1/f = 10.53
(2): f2/f3 = 1.62
(3): f/f3 = 0.55
(4): n1p = 1.904
(5): ν1p = 31.31
(6): Δ3/Δ2 = 1.15

Figure 6A:
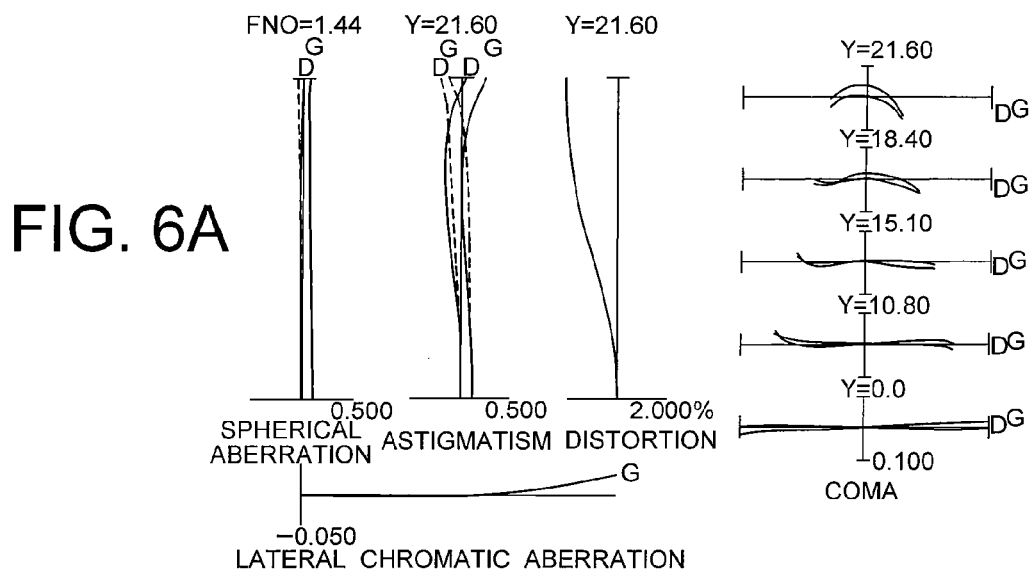
Figure 6B:
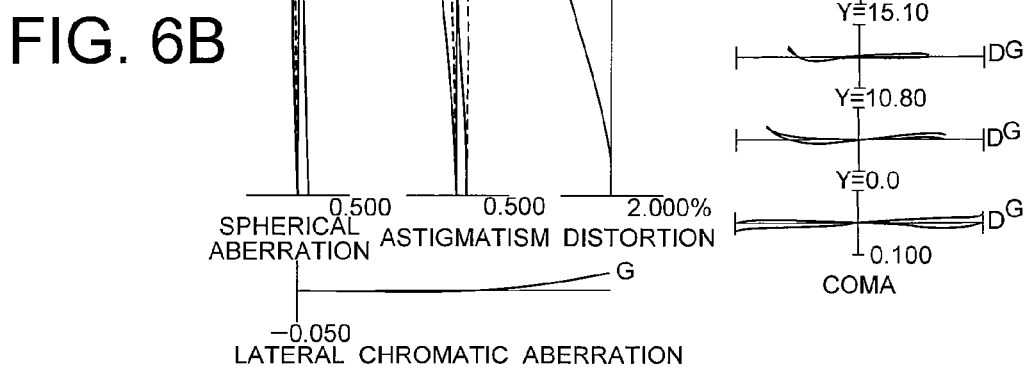
Figure 6C:
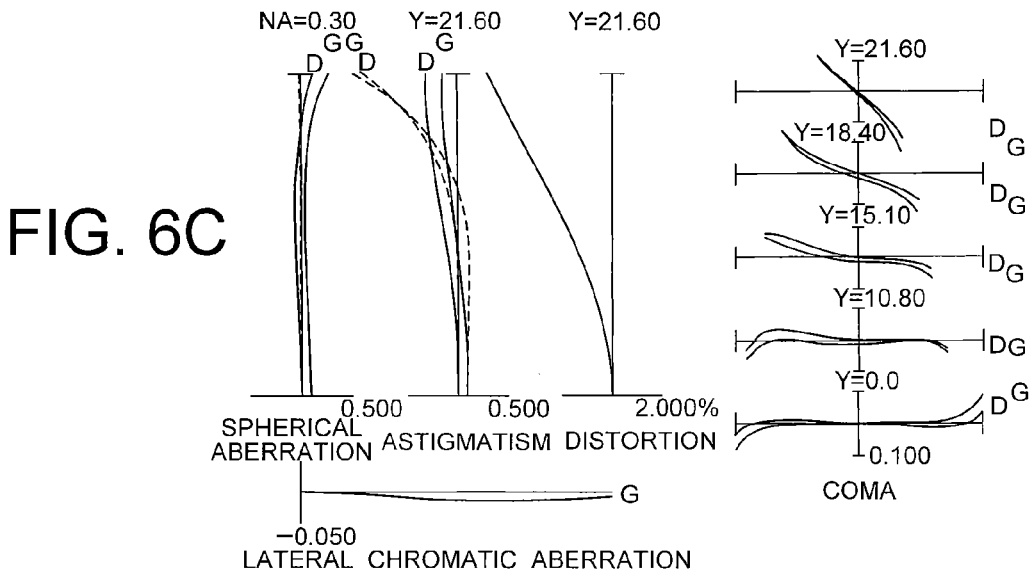

FIGS. 6A, 6B and 6C are graphs showing various aberrations of the wide-angle lens according to Example 3, in which FIG. 6A shows upon focusing on an object locating at infinity (β=0.00), FIG. 6B shows upon focusing on an object locating at an intermediate distance (β=−0.033), and FIG. 6C shows upon focusing on an object locating at the closest distance (β=−0.30).

As is apparent from the respective graphs, the wide-angle lens according to Example 3 shows superb optical performance as a result of good corrections to various aberrations.

As described above, the present embodiment makes it possible to provide a wide-angle lens having a wide angle of view of 80 degrees or more, a large aperture with a wide-open f-number of about 1.4, and excellent optical performance, suitable for a single-lens reflex camera and a digital camera.

Then, a camera equipped with the wide-angle lens according to the present embodiment is explained below. Although a case where the wide-angle lens according to Example 1 is installed into a camera is explained, the same result can be obtained by any other Examples.

Figure 7:
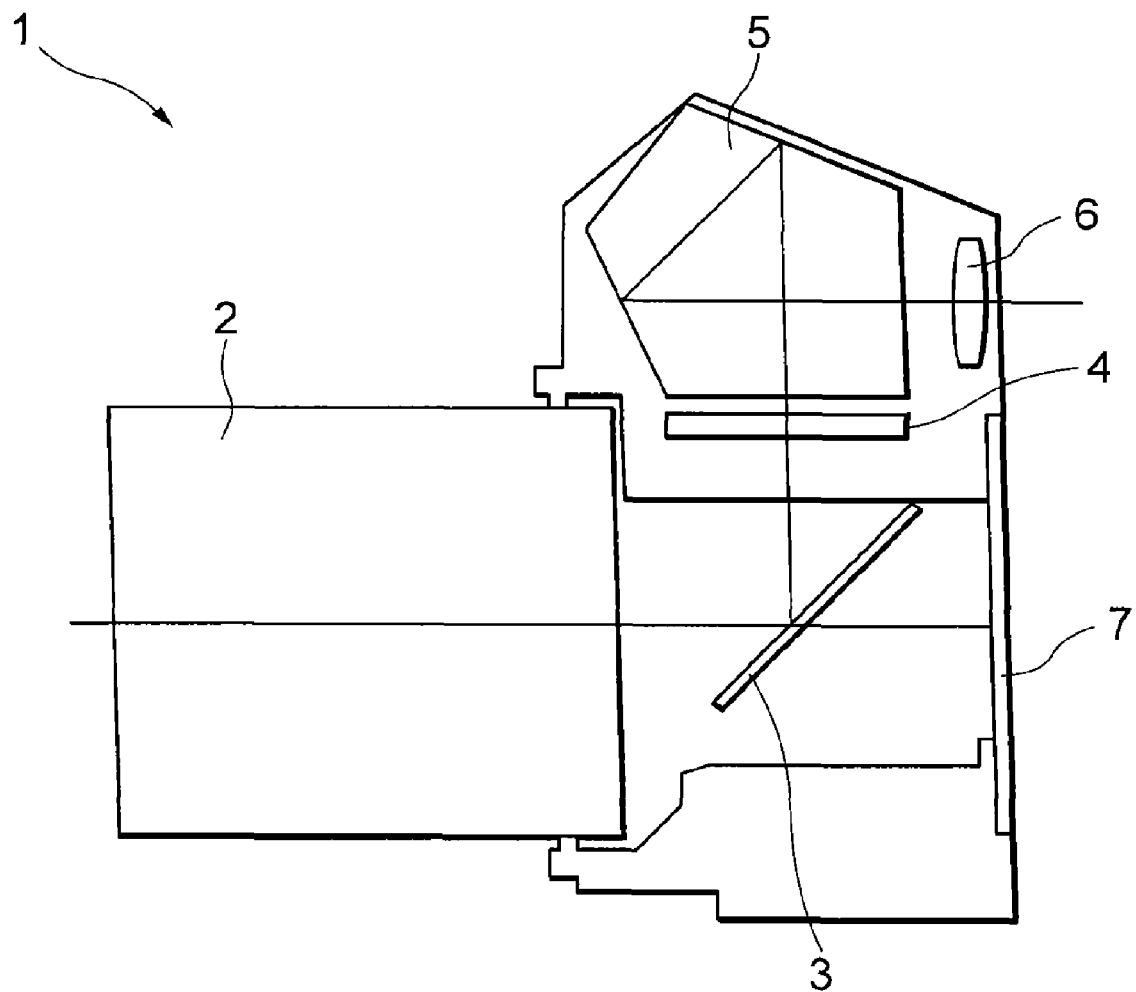
FIG. 7 is a diagram showing a camera equipped with the wide-angle lens according to Example 1.

FIG. 7 is a schematic diagram showing a camera equipped with the wide-angle lens according to Example 1.

As shown in FIG. 7, the camera 1 is a single-lens reflex digital camera equipped with the wide-lens angle lens according to Example 1 as an image-taking lens 2. In the camera 1, light emitted from an object (not shown) is converged by an image-taking lens 2, and focused on a focusing screen 4 through a quick return mirror 3. The light focused on the focusing screen 4 is reflected a plurality of times by a pentagonal roof prism 5, and led to an eyepiece 6. Accordingly, a photographer can observe the object image as an erected image through the eyepiece 6.

When the photographer presses a shutter release button (not shown), the quick return mirror 3 is removed from an optical path, and the light from the object (not shown) reaches an imaging device 7. Accordingly, light from the object forming the object image is captured by the imaging device 7 and stored in a memory (not shown) as an object image. In this manner, the photographer can take a picture of the object by the camera 1.

With installing the wide-angle lens according to Example 1 into the camera 1 as an image-taking lens 2, it becomes possible to realize a camera having high optical performance.

An outline of a method for manufacturing the wide-angle lens including, in order from an object, a first lens group G1, a second lens group G2, and a third lens group G3 is explained below with reference to FIG. 8.

Figure 8:
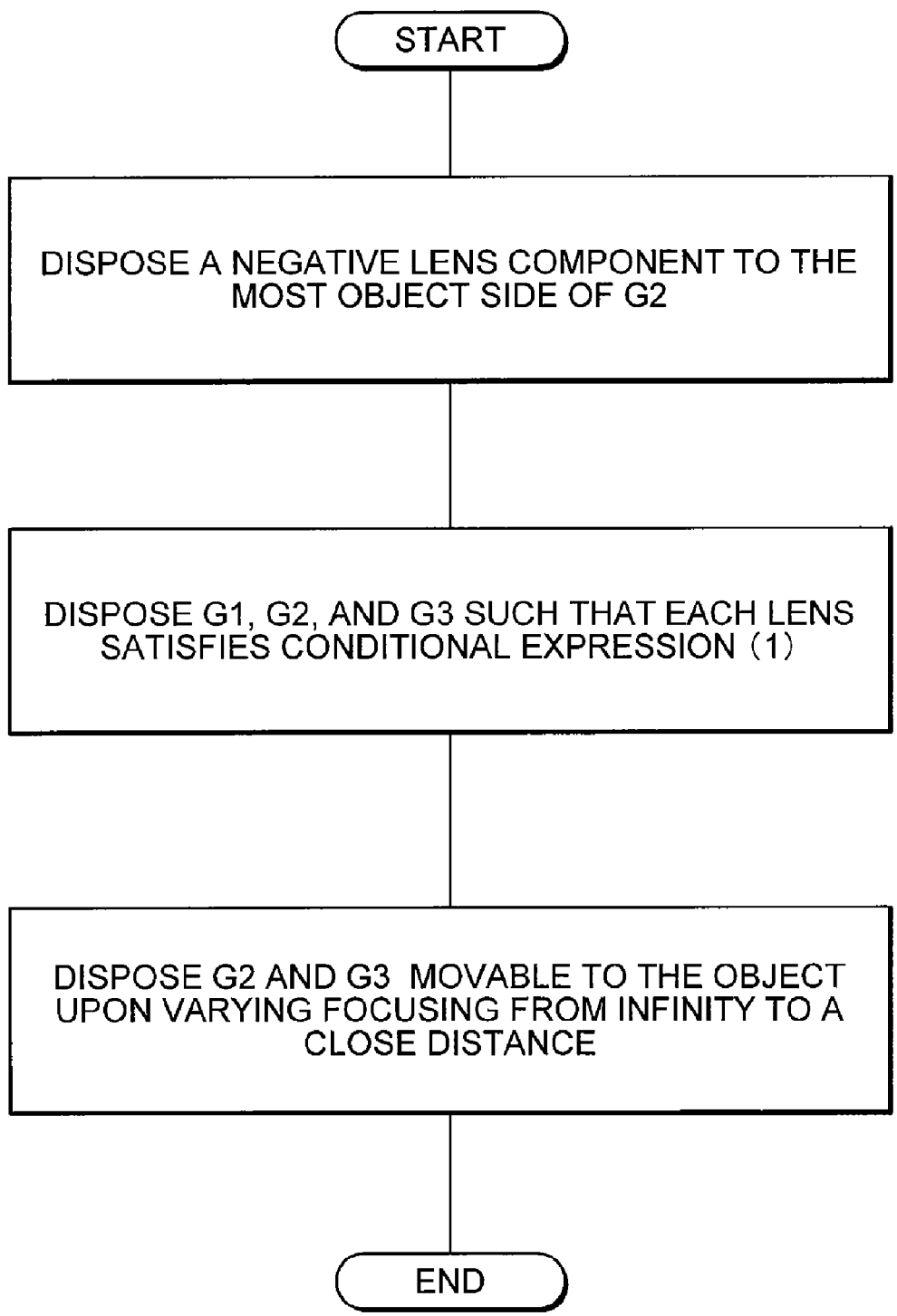
FIG. 8 is a flowchart showing a procedure of a method for manufacturing the wide-angle lens according to the present embodiment.

FIG. 8 is a flowchart showing a procedure of a method for manufacturing the wide-angle lens according to the present embodiment.

At first, each lens of the first lens group G1, the second lens group G2, and the third lens group G3 is disposed in a lens barrel having cylindrical shape such that a negative lens component is disposed to the most object side of the second lens group G2, the first lens group G1, the second lens group G2 and the third lens group satisfy the following conditional expression (1):

$$6.00 < -f1/f \qquad (1)$$

where f1 denotes a focal length of the first lens group G1, and f denotes a focal length of the wide-angle lens, and upon varying focusing from infinity to a close distance, the first lens group G1 is fixed, and the second lens group G2 and the third lens group G3 are movable to the object.

Then, an outline of a method for manufacturing the wide-angle lens according to another aspect of the present embodiment including, in order from an object, a first lens group G1, a second lens group G2, and a third lens group G3 is explained below with reference to FIG. 9.

Figure 9:
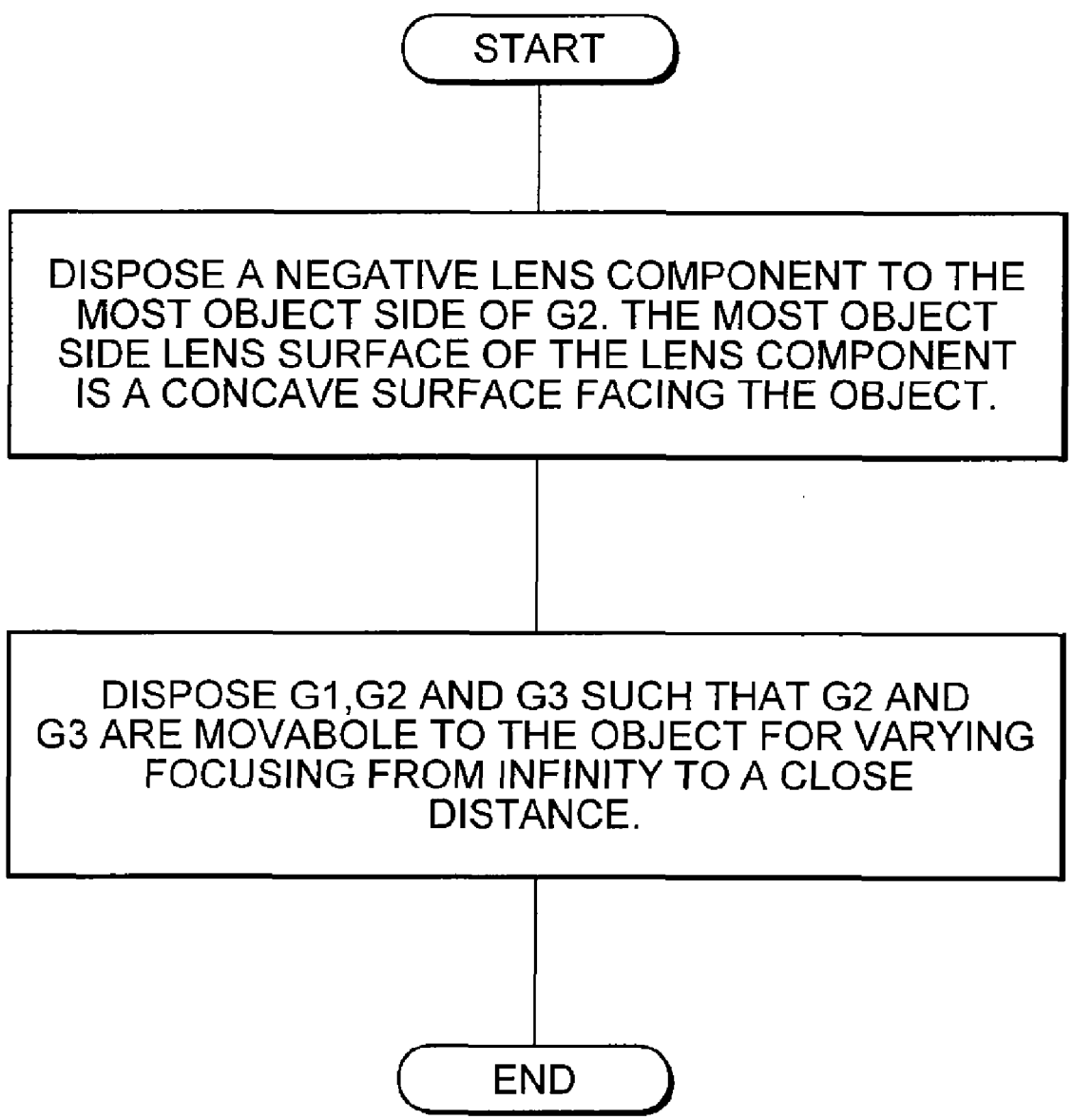
FIG. 9 is a flowchart showing a procedure of a method for manufacturing the wide-angle lens according to another aspect of the present embodiment.

FIG. 9 is a flowchart showing a procedure of a method for manufacturing the wide-angle lens according to another aspect of the present embodiment.

At first, each lens of the first lens group G1, the second lens group G2, and the third lens group G3 is disposed in a lens barrel having cylindrical shape such that a negative lens component is disposed to the most object side of the second lens group, the most object side lens surface of the lens component is a concave surface facing the object, and the first lens group is fixed, and the second lens group and the third lens group are movable to the object for varying focusing from infinity to a close distance.

Incidentally, the following description may suitably be applied within limits that do not deteriorate optical performance.

Although a three-lens-group configuration is shown in each Example of the present embodiment, the present embodiment can be applied to other lens-group configurations such as a four-lens-group configuration, and a five-lens-group configuration.

In each Example, in order to vary focusing from infinity to a close distance, a portion of a lens group, a single lens group, or a plurality of lens groups may be moved along the optical axis.

The focusing lens group(s) may be used for auto focus, and suitable for being driven by a motor such as an ultrasonic motor. It is preferable that the second lens group and the third lens group are used as the focusing lens group.

A lens group or a portion of a lens group may be shifted in a direction perpendicular to the optical axis as a vibration reduction lens group for correcting an image blur caused by a camera shake. It is particularly preferable that at least a portion of the second lens group or the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the vicinity of the third lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A wide-angle lens comprising, in order from an object:
   a first lens group having negative refractive power;
   a second lens group having positive refractive power; and
   a third lens group having positive refractive power;
   the second lens group and the third lens group being movable to the object, with the first lens group being fixed, for varying focusing from infinity to a close distance,
   a negative lens component being disposed to the most object side in the second lens group, and
   the following conditional expression being satisfied:

$$7.50 < -f1/f$$

where f denotes a focal length of the wide-angle lens, and f1 denotes a focal length of the first lens group.

2. The wide-angle lens according to claim 1, wherein an aperture stop is disposed between the second lens group and the third lens group.

3. The wide-angle lens according to claim 1, wherein the following conditional expression is satisfied:

$$1.00 < f2/f3 < 2.00$$

where f2 denotes a focal length of the second lens group, and f3 denotes a focal length of the third lens group.

4. The wide-angle lens according to claim 1, wherein the most object side lens surface of the lens component in the second lens group is a concave surface facing the object.

5. The wide-angle lens according to claim 1, wherein the most image side lens surface of the lens component in the second lens group is a concave surface facing the image.

6. The wide-angle lens according to claim 1, wherein the first lens group includes three negative lenses with no intervening positive lenses.

7. The wide-angle lens according to claim 1, wherein the following conditional expression is satisfied:

$$0.30 < f/f3 < 1.00$$

where f3 denotes a focal length of the third lens group.

8. The wide-angle lens according to claim 1, wherein the first lens group includes at least one positive lens and satisfies the following conditional expression:

$$1.800 < n1p$$

where n1p denotes an average refractive index of all positive lenses in the first lens group at d-line.

9. The wide-angle lens according to claim 1, wherein the first lens group includes at least one positive lens and satisfies the following conditional expression:

$$28.00 < v1p$$

where v1p denotes an average Abbe number of all positive lenses in the first lens group at d-line.

10. The wide-angle lens according to claim 1, wherein the following conditional expression is satisfied:

$$1.00 \leq \Delta3/\Delta2 < 1.50$$

where $\Delta3$ denotes a moving amount of the third lens group upon varying focusing from infinity to a close distance, and $\Delta2$ denotes a moving amount of the second lens group upon varying focusing from infinity to a close distance.

11. The wide-angle lens according to claim 1, wherein the second lens group and the third lens group are moved to the object side with the same moving amount upon varying focusing from infinity to a close distance.

12. The wide-angle lens according to claim 1, wherein the first lens group includes an aspherical surface.

13. The wide-angle lens according to claim 1, wherein the third lens group includes an aspherical surface.

14. An optical apparatus equipped with the wide-angle lens according to claim 1.

15. A wide-angle lens comprising, in order from an object:
   a first lens group having negative refractive power;
   a second lens group having positive refractive power; and
   a third lens group having positive refractive power;
   the second lens group and the third lens group being movable to the object for varying focusing from infinity to a close distance,
   a negative lens component being disposed to the most object side in the second lens group,
   the most object side lens surface of the lens component in the second lens group is a concave surface facing the object, and
   the first lens group including at least one positive lens and satisfying the following conditional expression:

$$28.00 < v1p$$

where v1p denotes an average Abbe number of all positive lenses in the first lens group at d-line.

16. A method for manufacturing a wide-angle lens that includes, in order from an object, a first lens group having negative refractive power, a second lens group having positive refractive power, and a third lens group having positive refractive power, the method comprising steps of:
   disposing a negative lens component to the most object side in the second lens group;
   disposing each lens in the wide-angle lens such that the following conditional expression is satisfied:

$$7.50 < -f1/f$$

where f denotes a focal length of the wide-angle lens, and f1 denotes a focal length of the first lens group;
   disposing the first lens group, the second lens group, and the third lens group such that second lens group and the third lens group are movable to the object, with the first lens group being fixed, for varying focusing from infinity to a close distance.

17. The method according to claim 16, wherein the following conditional expression is satisfied:

$$1.00 < f2/f3 < 2.00$$

where f2 denotes a focal length of the second lens group, and f3 denotes a focal length of the third lens group.

18. The method according to claim 16, wherein the most object side lens surface of the lens component in the second lens group is a concave surface facing the object.

19. The method according to claim 16, further comprising a step of:

disposing the second lens group and the third lens group such that the following conditional expression is satisfied:

$$1.00 \leq \Delta 3/\Delta 2 < 1.50$$

where $\Delta 3$ denotes a moving amount of the third lens group upon varying focusing from infinity to a close distance, and $\Delta 2$ denotes a moving amount of the second lens group upon varying focusing from infinity to a close distance.

20. A method for manufacturing a wide-angle lens that includes, in order from an object, a first lens group having negative refractive power, a second lens group having positive refractive power, and a third lens group having positive refractive power, the method comprising steps of:

disposing a negative lens component to the most object side in the second lens group, the most object side lens surface of the lens component having a concave surface facing the object;

disposing the first lens group, the second lens group and the third lens group such that the second lens group and the third lens group are movable to the object for varying focusing from infinity to a close distance; and providing the first lens group with at least one positive lens such that the following conditional expression is satisfied:

$$28.00 < v1p$$

where v1p denotes an average Abbe number of all positive lenses in the first lens group at d-line.

* * * * *